Aug. 26, 1924.

A. GAGG 1,505,953

ROTARY VALVE FOR PIPE LINES

Filed Nov. 26, 1923

Inventor
Anton Gagg,

Patented Aug. 26, 1924.

1,505,953

UNITED STATES PATENT OFFICE.

ANTON GAGG, OF ZURICH, SWITZERLAND, ASSIGNOR TO THE FIRM: AKTIENGESELL-SCHAFT DER MASCHINENFABRIKEN ESCHER WYSS & CIE., OF ZURICH, SWITZERLAND.

ROTARY VALVE FOR PIPE LINES.

Application filed November 26, 1923. Serial No. 676,999.

*To all whom it may concern:*

Be it known that I, ANTON GAGG, a citizen of the Republic of Switzerland, residing at Zurich, Switzerland, have invented certain new and useful Improvements in Rotary Valves for Pipe Lines, of which the following is a specification, reference being had therein to the accompanying drawing.

The present invention relates to improvements in rotary valves for pipe lines described and claimed in the application of Huguenin and Gagg Ser. No. 621386 filed Febr. 26, 1923. The object of the present invention is to facilitate the movement of the rotary gate body after the movable closing or packing disc has been relieved of the pressure present in the pipe line. To this end according to the present invention the outer surface of the movable closing disc is provided with a part arranged in such a manner that the pressure present inside the valve casing acts on the closing disc in opposition to the pressure present in the hollow space arranged in front of the closing disc. The outer surface of the movable closing disc is preferably provided with a ledge or shoulder exposed to the pressure present inside the valve casing.

A constructional example of the subject matter of the present invention is illustrated on the accompanying drawing, in which.

Figure 1:
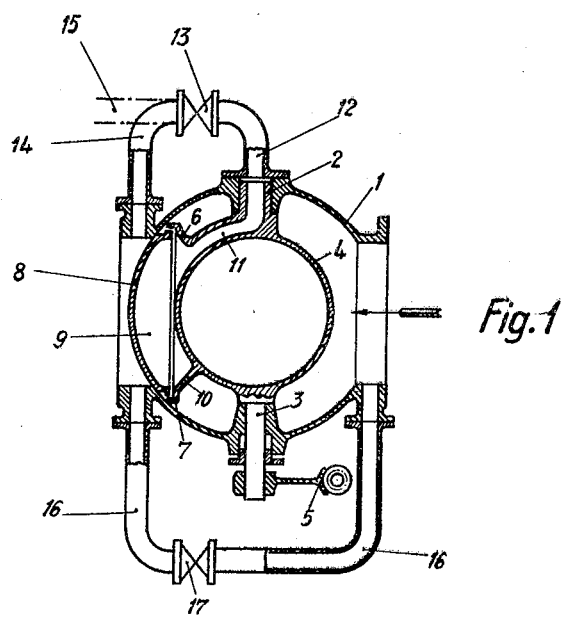
Fig. 1 is a section along the axis of rotation through the closed valve.
Figure 2:
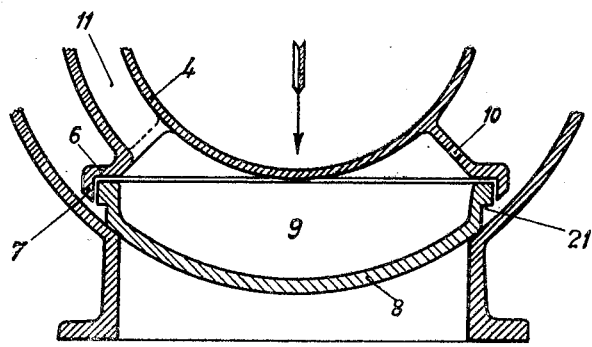
Fig. 2 shows on a larger scale a detail of Fig. 1.

In the drawing 1 denotes again the spherical valve casing in which the rotary gate body 4 is rotatably mounted by the fulcrum pins 2 and 3. On the extension of pin 3 a gear 5 is fixed by means of which rotation is imparted to the gate body 4. The latter is, in the same manner as in the original patent, provided with a lateral extension 6 having a short cylindrical flange 7 in which the closing or packing disc 8 is movably arranged, as little clearance as possible being provided between flange 7 and closing disc 8. The latter is provided on its outer surface, i. e. on its left hand side when looking at Fig. 1, with a ledge 21 (Fig. 2). The hollow space 9 formed by the gate body 4 comprising the extension 6 and the closing disc 8 is on one side connected to the interior of the valve casing 1, which is filled with the medium under pressure, through a small opening 10, and on the other hand said hollow space 9 is connected by means of a channel 11 extending through the pin 2 with the discharge or relief pipe 12. A shut-off device 13 inserted in the pipe 12 serves to connect the latter with a pipe 14 leading to the space behind the gate body. As indicated in dotted lines the pipe 12 may be connected by means of the shut-off device 13 also to a conduit 15 leading to the outside. 16 denotes the known by-pass conduit having a shut-off member 17, by means of which by-pass the space at the rear of the valve may be filled in the known manner and at least partly exposed to pressure before the gate body is moved into the open position.

The pressure present inside the rotary valve casing acts upon the ledge 21 of the closing disc 8 and is opposed to the pressure present in the hollow space 9. When the shut-off device 13 is opened, the pressure in the space 9 decreases and the pressure acting on the ledge 21 causes the closing disc 8 to be lifted off the valve seat. In consequence thereof the gate body 4 can easily be rotated as the disc 8 does not cause any friction during this turning motion.

I claim:

1. A rotary valve for pipe lines, comprising in combination a valve casing provided with a seat, a gate body movable within said casing, a closing member provided with a seat adapted to cooperate with the seat of the casing, said member being movable relatively to and with the gate body and confining together with the latter a hollow space adapted to take up fluid in order to press said member against the seat of the casing, said member being so designed that the pressure present inside the valve casing acts on the member in opposition to the pressure present in said hollow space, and means for relieving said space from pressure whilst said member is still in closing position.

2. A rotary valve for pipe lines, comprising in combination a valve casing provided with a seat, a gate body movable within said casing, a closing member provided with a seat adapted to cooperate with the seat of the casing, said member being movable relatively to and with the gate body and confining together with the latter a hollow space adapted to take up fluid in order to press said member in the closing position against the seat of the casing, a ledge provided on the outer surface of said member and exposed to the pressure present inside the valve casing, and means for relieving said space from pressure whilst said member is still in closing position.

3. A rotary valve for pipe lines, comprising in combination a valve casing provided with a seat, a gate body movable within said casing, a closing member provided with a seat adapted to cooperate with the seat of the casing, said member being movable relatively to and with the gate body and confining together with the latter a hollow space adapted to be supplied with throttled fluid in order to press said member in the closing position against the seat of the casing, a ledge provided on the outer surface of said member and exposed to the pressure present inside the valve casing, and a relatively large discharge pipe for relieving said space from pressure whilst said member is still in the closing position.

4. A rotary valve for pipe lines, comprising in combination a valve casing provided with a seat, a gate body movable within said casing, journals one of which being hollow on the gate body having their bearings in the valve casing, a closing member provided with a seat adapted to cooperate with the seat of the casing, said member being movable relatively to and with the gate body and confining together with the latter a hollow space adapted to be supplied with throttled fluid in order to press said member in the closing position against the seat of the casing, a ledge provided on the outer surface of said member and exposed to the pressure present inside the valve casing, and a relatively large discharge pipe connected to the hollow journal for relieving said space from pressure whilst said member is still in the closing position to cause the journals on the gate body to take up the whole pressure on said body.

In testimony whereof I affix my signature.

ANTON GAGG.